(12) United States Patent
Cramer et al.

(10) Patent No.: US 8,659,752 B2
(45) Date of Patent: Feb. 25, 2014

(54) AUTOMATED WARM-UP AND STABILITY CHECK FOR LASER TRACKERS

(75) Inventors: Peter G. Cramer, Coatesville, PA (US); Kenneth Steffey, Longwood, FL (US); John M. Hoffer, Jr., Bal Air, MD (US)

(73) Assignee: Faro Technologies, Inc., Lake Mary, FL (US)

(*) Notice: Subject to any disclaimer, the term of this patent is extended or adjusted under 35 U.S.C. 154(b) by 0 days.

(21) Appl. No.: 13/281,151

(22) Filed: Oct. 25, 2011

(65) Prior Publication Data

US 2012/0099100 A1    Apr. 26, 2012

Related U.S. Application Data

(60) Provisional application No. 61/406,393, filed on Oct. 25, 2010.

(51) Int. Cl.
   *G01B 11/26* (2006.01)
(52) U.S. Cl.
   USPC ........................ 356/138; 356/139.07
(58) Field of Classification Search
   USPC ............... 356/138–139, 139.07, 147, 356/152.1–152.3, 3, 3.01, 482, 498, 500, 356/508, 154, 4.01, 141.1, 141.5, 244, 614, 356/622, 620; 33/290, 291, 292, 503; 358/474, 475; 700/247, 245
   See application file for complete search history.

(56) References Cited

U.S. PATENT DOCUMENTS

| | | |
|---|---|---|
| 4,346,989 A | 8/1982 | Gort et al. |
| 4,714,339 A | 12/1987 | Lau et al. |
| 4,790,651 A | 12/1988 | Brown et al. |
| 7,327,446 B2 | 2/2008 | Cramer et al. |
| 7,430,068 B2 | 9/2008 | Becker et al. |
| 7,446,401 B2 | 11/2008 | Huang |
| 7,583,375 B2 | 9/2009 | Cramer et al. |

(Continued)

FOREIGN PATENT DOCUMENTS

| | | |
|---|---|---|
| WO | 2004113835 A1 | 12/2004 |
| WO | 2008077432 A1 | 7/2008 |

OTHER PUBLICATIONS

International Search Report; International Application No. PCT/US2011/057659; International Filing Date: Oct. 25, 2011; Date of Mailing: Feb. 24, 2012; 4 pages.
Written Opinion; International Application No. PCT/US2011/057659; International Filing Date: Oct. 25, 2011; Date of Mailing: Feb. 24, 2012; 6 pages.

(Continued)

*Primary Examiner* — Tri T Ton
(74) *Attorney, Agent, or Firm* — Cantor Colburn LLP

(57) ABSTRACT

A method for determining when a laser tracker is stable includes performing a plurality of first frontsight measurements and a plurality of first backsight measurements on a first target with the laser tracker, wherein the plurality of first frontsight measurements and the plurality of first backsight measurements are alternated in time, calculating a plurality of first two-face errors based on the plurality of first frontsight measurements and the plurality of first backsight measurements, determining at least one first stability metric based at least in part on the plurality of first two-face errors, the at least one first stability metric being a value defined by a rule, determining whether the laser tracker is stable based at least in part on the at least one first stability metric and a first termination criterion and generating an indication whether the laser tracker is stable or not stable.

17 Claims, 11 Drawing Sheets

(56) References Cited

U.S. PATENT DOCUMENTS

| | | |
|---|---|---|
| 7,800,758 B1 | 9/2010 | Bridges et al. |
| 7,847,922 B2 | 12/2010 | Gittinger et al. |
| 2005/0102063 A1 | 5/2005 | Bierre |
| 2005/0179890 A1 | 8/2005 | Cramer et al. |
| 2009/0109426 A1* | 4/2009 | Cramer et al. .............. 356/154 |
| 2010/0195117 A1 | 8/2010 | Easley et al. |

OTHER PUBLICATIONS

Examination Report under Section 18(3) for Application No. GB130799.1 filed Oct. 25, 2011; Date of Report: May 21, 2013; 2 pagesd.

International Preliminary Report on Patentability for International Application No. PCT/US2011/057659 file Oct. 25, 2011; Date of Issuance of Report: Apr. 30, 2013; 6 pages.

* cited by examiner

AUTOMATED WARM-UP AND STABILITY CHECK FOR LASER TRACKERS

CROSS REFERENCE TO RELATED APPLICATIONS

The present application claims the benefit of the legally related U.S. Provisional Patent Application Ser. No. 61/406,393 filed Oct. 25, 2010, which is fully incorporated herein by reference.

FIELD OF INVENTION

The present invention relates to instrument warm-up and stability, and more particularly to systems and methods for automatically warming up instruments such as laser trackers or for checking the stability of such instruments.

BACKGROUND

There is a class of instrument that measures the coordinates of a point by sending a laser beam to the point. The laser beam may impinge directly on the point or may impinge on a retroreflector target that is in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest. Exemplary systems for determining coordinates of a point are described by U.S. Pat. No. 4,790,651 to Brown et al. and U.S. Pat. No. 4,714,339 to Lau et al.

The laser tracker is a particular type of coordinate-measuring device that tracks the retroreflector target with one or more laser beams it emits. A device that is closely related to the laser tracker is the laser scanner. The laser scanner steps one or more laser beams to points on a diffuse surface. The laser tracker and laser scanner are both coordinate-measuring devices. Exemplary laser scanners are described in U.S. Pat. No. 7,430,068 to Becker et al., incorporated herein by reference, and U.S. Pat. No. 7,847,922 to Gittinger et al., incorporated herein by reference. It is common practice today to use the term laser tracker to also refer to laser scanner devices having distance- and angle-measuring capability. There is also a hybrid category of instruments known as total stations or tachymeters that may measure a retroreflector or a point of a diffusely scattering surface. An exemplary total station is described in U.S. Pat. No. 4,346,989 to Gort et al. Laser trackers, which typically have accuracies on the order of a thousand of an inch and as good as one or two micrometers under certain circumstances, are usually much more accurate than total stations or scanners. The broad definition of laser tracker, which includes laser scanners and total stations, is used throughout this application.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

Compensation parameters are numerical values that are stored in software or firmware accessible to the tracker. These numerical values are applied to raw tracker data to improve tracker accuracy. Initially, the manufacturer of the tracker finds the compensation parameters by performing measurements called compensation procedures. Later, the tracker will be used at the customer's site to make measurements. Periodically, the tracker will be checked for accuracy by performing interim tests. If the accuracy is substandard, the tracker operator will perform one or more compensation procedures on the factory floor. These can take from a few minutes to an hour or more, depending on the particular tracker and on the tests that are required. In most cases, the main cause of reduced tracker accuracy is thermal drift, although mechanical shock can also be important.

Compensation parameters generally relate to physical characteristics of the instrument. In examples given hereinbelow, some of these compensation parameters relate to (1) offset of a laser beam with respect to a mechanical point of rotation (gimbal point), (2) angle of a laser beam with respect to a line drawn perpendicular to two mechanical axes, and (3) non-squareness of two mechanical axes. Many other types of compensation parameters are used, but generally these compensation parameters (also called kinematic model parameters or simply parameters) relate to physical characteristics of the instrument. Hereinafter the terms compensation parameter and parameter are taken to be synonymous.

When a laser tracker is powered on after having been off for a significant time, it warms up as a result of the heat produced by the motors and the internal electronics. After a period of time, typically on the order of an hour or two, the tracker reaches a stable equilibrium temperature, if the ambient temperature is stable. After warm-up is complete, standard metrology practice calls for compensating the instrument, followed by an interim test procedure to verify that the compensation was successful. After compensation and the test procedure have been completed, the tracker is ready to take measurements. If the compensation procedure is performed on the laser tracker before the tracker is fully warmed up, the compensation parameters will continue to change as the tracker continues to warm up. As this happens, compensation parameters become less and less accurate and the measurement results degrade correspondingly.

From a practical point of view, the time taken for warm-up, compensation and testing is lost time, because the tracker is not available to take measurements. For this reason, it is standard metrology practice to keep the tracker powered on continuously whenever possible. This eliminates the warm-up period and assures that the tracker is ready to take measurements at any time.

In many real world situations, however, it is not possible to keep the instrument powered on continuously. For example, the instrument may need to be stored or transported to another job site, or the user may simply want to conserve energy. In such cases it is not possible to avoid warm-up. In these cases, the best that one can hope for is to minimize the amount of time lost, both for the instrument and for the user.

The warm-up scenario places the user in a difficult situation. On the one hand, there is a need to minimize the amount of time that is lost waiting for the instrument to warm-up. On the other hand, there is a need for accuracy in subsequent measurements. This tradeoff is faced by laser tracker users every time they power up their instruments.

The difficulty is exacerbated by the fact that every warm-up sequence is different. The detailed behavior depends on the initial temperature distribution within the tracker, the ambient conditions, and the idiosyncrasies of the individual instrument. The initial transient behavior and the final steady state behavior are obscured to some extent by random noise and long term drift. Also, while the long term behavior is roughly steady state, there is an element of subjectivity when a human operator decides whether the instrument is "close enough" to a steady-state value. In other words, the detailed behavior of a laser tracker during warm-up is complex, and determining when the tracker is warmed up is a non-trivial exercise.

Perhaps the greatest limitation of present methods is that there is no guarantee that the user possesses sufficient skill and knowledge to make the warm-up determination correctly, which can lead to many errors.

To some extent, the way the tracker is mounted may help to reduce the required warm-up time. An example of such a way of mounting a tracker is given in U.S. Published Application No. 2010/0195117 to Easley et al. However, this mounting method does not provide a method for determining how long to wait before the tracker is warmed up.

There is also a need to check the stability of an instrument such as a laser tracker even if the instrument is already warmed up. One reason for checking instrument stability is to ensure that performance is consistently being met. It is particularly convenient if such a method of checking the instrument is performed automatically. In addition, if the instrument does not have the expected absolute performance or stability, it is highly desirable to have a method to diagnose the cause of the decreased performance or stability. It may also be desirable to provide a "paper trail" to auditors demonstrating that the laser tracker was warmed up or stable when used.

What is needed is an accurate, objective, quantitative, and possibly automated method to determine when an instrument is warmed up or stable.

SUMMARY

At least one exemplary embodiment includes a method for determining when a laser tracker is stable, the method including performing, by a processor, a plurality of first frontsight measurements and a plurality of first backsight measurements on a first target with the laser tracker, wherein the plurality of first frontsight measurements and the plurality of first backsight measurements are alternated in time, calculating, in the processor, a plurality of first two-face errors based on the plurality of first frontsight measurements and the plurality of first backsight measurements, determining, in the processor, at least one first stability metric based at least in part on the plurality of first two-face errors, the at least one first stability metric being a value defined by a rule, determining, by the processor, whether the laser tracker is stable based at least in part on the at least one first stability metric and a first termination criterion and generating an indication whether the laser tracker is stable or not stable.

Another exemplary embodiment includes a method for determining when a laser tracker is stable, the method including performing, by a processor, a plurality of first angle measurements in a first frontsight mode and a plurality of second angle measurements in a first backsight mode on a first target with the laser tracker, wherein the plurality of first angle measurements and the plurality of second angle measurements are alternated in time, calculating, by the processor, a plurality of first angular differences based on the plurality of first angle measurements and the plurality of second angle measurements, determining, by the processor, at least one first stability metric based at least in part on the plurality of first angle differences, the at least one first stability metric being a value defined by a rule, determining, by the processor, whether the laser tracker is stable based at least in part on the at least one first stability metric and a first termination criterion and generating an indication whether the laser tracker is stable or not stable.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION OF THE PREFERRED EMBODIMENTS

Figure 1:
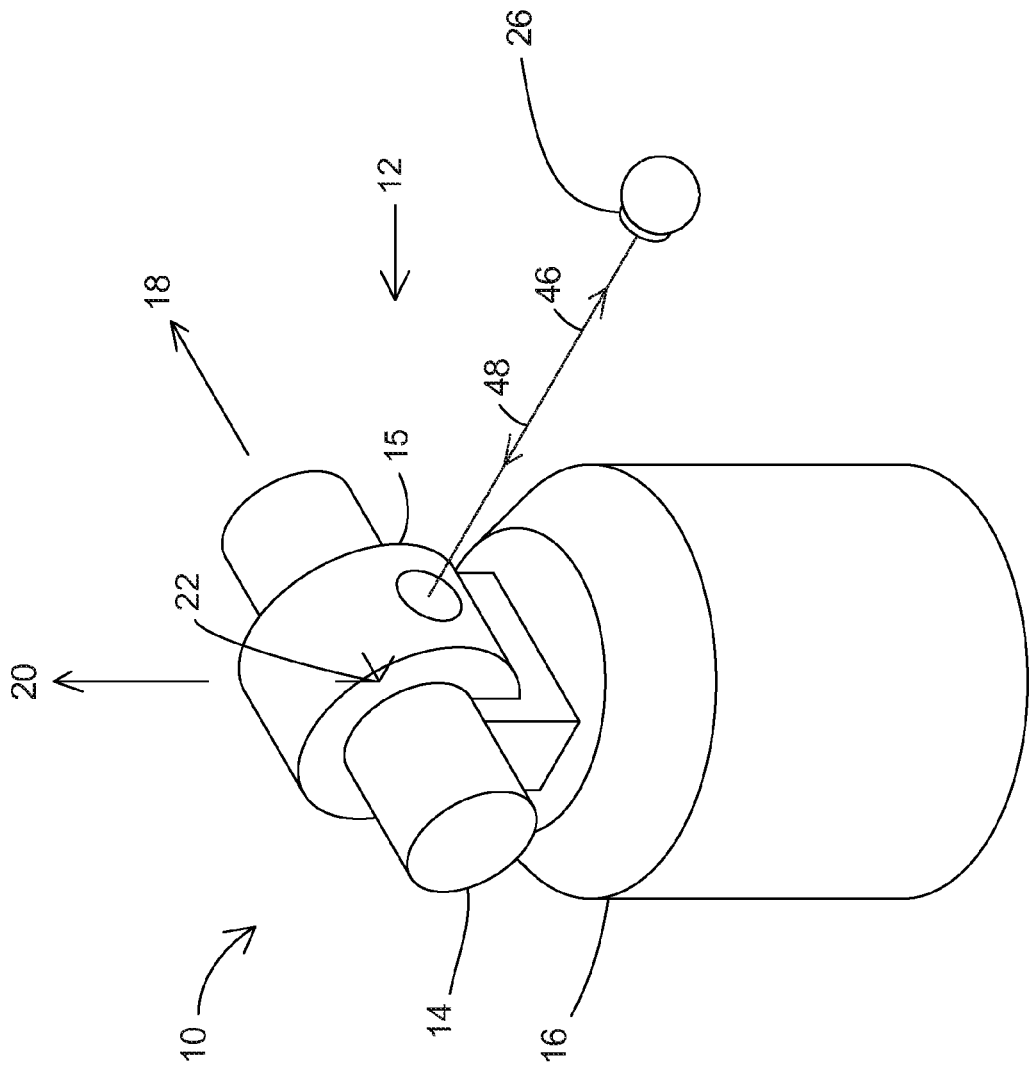
FIG. 1 illustrates a laser tracker in which exemplary automated warm-up and stability embodiments may be implemented.

FIG. 1 illustrates a laser tracker 10 in which exemplary automated warm-up and stability embodiments may be implemented. The laser tracker 10 sends a laser beam 46 from the laser tracker 10 to SMR 26, which returns the laser beam 48 to tracker 10. Laser beam 48 is slightly reduced in optical power with respect to laser beam 46 but otherwise is nearly identical to laser beam 46. An exemplary gimbaled beam-steering mechanism 12 of laser tracker 10 includes zenith carriage 14 mounted on azimuth base 16 and rotated about azimuth axis 20. Payload 15 is mounted on zenith carriage 14 and rotated about zenith axis 18. Zenith mechanical rotation axis 18 and azimuth mechanical rotation axis 20 intersect orthogonally, internally to tracker 10, at gimbal point 22, which is typically the origin for distance measurements. The laser beam 46 virtually passes through gimbal point 22 and is pointed orthogonal to zenith axis 18. In other words, the path of laser beam 46 is in the plane normal to zenith axis 18. Laser beam 46 is pointed in the desired direction by rotation of payload 15 about zenith axis 18 and by rotation of zenith carriage 14 about azimuth axis 20. Zenith and azimuth angular encoders, internal to the tracker (not shown), are attached to zenith mechanical axis 18 and azimuth mechanical axis 20 and indicate, to high accuracy, the angles of rotation. The laser beam 46 travels to SMR 26 and then back to laser tracker 10. The tracker 10 measures the radial distance between gimbal point 22 and retroreflector 26, as well as the rotation angles about the zenith and azimuth axes 18, 20, to find the position of retroreflector 26 within the spherical coordinate system of the tracker.

Frontsight mode is defined as the ordinary mode of operation of the tracker. Backsight mode is obtained by starting in frontsight mode and then doing the following: (1) rotating the azimuth axis by 180 degrees; (2) rotating the zenith axis (which may rotate a payload or a mirror) to have the negative of the original zenith angle (where the direction of the azimuth axis 20 corresponds to a zenith angle of zero); and (3) turning on tracking. The last step will cause the laser beam to move to the proper position on the cube-corner or mirror so that the laser beam 48 retraces the path of laser beam 46. In an ideal laser tracker, the measured angles of a retroreflector or mirror target in frontsight mode and backsight mode are the same. In a real tracker, these angles are not exactly the same, and the discrepancy is an indicator of the quality of measurement of the tracker. The two-face measurement is particularly sensitive to parameter errors, discussed in more detail hereinbelow and hence provides an effective test for quickly evaluating a laser tracker.

The term laser tracker may be used broadly to encompass laser scanner devices as well as traditional laser trackers. A two face measurement may be obtained using a laser scanner but in a scanner, there is no tracking function. Instead the scanner measures the diffuse target, which might be a sphere, by measuring the sphere at a number of points in frontsight mode. A best-fit procedure is carried out to find the best estimate of the sphere center in frontsight mode by applying an optimization procedure to fit a sphere to the "cloud of points" collected by the laser scanner. To get into backsight mode, the azimuth axis is rotated by 180 degrees and the zenith axis (which may rotate a mirror) is rotated to the negative of the original zenith angle (in a spherical coordinate system, with a zenith angle of zero degrees corresponding to the "straight up" direction). The scanner measures the diffuse target a second time in backsight mode by applying an optimization procedure to fit a sphere to the "cloud of points" collected by the laser scanner. A best-fit procedure is carried out to find the best estimate of the sphere center in backsight mode. The difference between the calculated frontsight and backsight centers is taken to be the two-face error.

In the two-face measurement, an (x, y, z) value is obtained in frontsight mode and an (x, y, z) value is obtained in backsight mode. Here x, y, and z are coordinates within the fixed frame of reference within which the laser tracker sits. It is customary in two-face measurements to set the radial distance to be the same value for frontsight and backsight modes. As a result, the difference in the frontsight and backsight coordinate readings is entirely along the transverse direction. Here transverse direction is defined as the direction perpendicular to the laser beam from the tracker. The two-face difference, also known as the two-face error, is the transverse distance between readings obtained in frontsight and backsight modes.

The reason two-face measurements are particularly effective at indicating tracker problems is that they are sensitive to many of the typical error modes within a laser tracker. In an ideal tracker the laser beam passes, at least virtually, through the tracker gimbal point. In a real tracker, the laser beam is offset with respect to the gimbal point. This offset gives rise to two parameters—TX and TY—which are simply the offset distances in the X and Y directions at the line of closest approach to the gimbal point. Here the X and Y directions are taken with respect to payload 15 of FIG. 1. (These differ from the x and y directions, which are taken with respect to the fixed frame of reference within which the laser tracker sits.)

As long as these parameters are stable and are known accurately, then the offset in the laser beam with respect to the gimbal point will not cause an error. However, if the offset changes with temperature, for example as the tracker warms up, then the true values of TX and TY also change. The two-face measurement is very sensitive to TX and TY errors.

In an ideal tracker, the laser beam is perpendicular to the azimuth mechanical axis and zenith mechanical axis. In a real tracker, the laser beam departs slightly from perpendicularity. This tilt in the laser beam gives rise to two parameters—RX and RY—which are simply the angular tilts about the X and Y directions. As long as these parameters are stable and are known accurately, then the tilt in the laser beam with respect to the mechanical axes will not cause an error. However, if the offset changes with temperature, for example as the tracker warms up, then the true values of RX and RY also change. The two-face measurement is very sensitive to RX and RY errors.

The methods for finding parameters TX, TY, RX, RY for the type of tracker shown in FIG. 1 are described in U.S. Pat. No. 7,327,446 ('446) to Cramer et al., incorporated by reference herein. Other formulas will be applicable to laser trackers that use other beam steering methods. For example, some laser trackers use a mirror to steer the laser beam, and these trackers have different parameters than the tracker shown in FIG. 1. However, two-face tests are used to identify problems and find parameters for all types of trackers regardless of the beam steering mechanism.

Two-face errors may also reflect other types of tracker errors. For example, it can sensitive many types of errors seen in the angular encoders. Under some conditions, it is also sensitive to axis non-squareness errors.

If the tracker is stable, then the two-face measurement can be used as part of a compensation procedure to find the correct parameter values. If the tracker is not stable, then the variability in the two-face measurement values can be used to identify this lack of stability. The particular parameters values and how these values change in time can be used as a diagnostic tool to assist the user or service representative in finding the physical cause of any problem that may occur. This is one of the reasons that the exemplary methods described herein are useful for checking the stability of a tracker that is already warmed up as well as a tracker that is in the warm-up phase.

Exemplary embodiments described hereinbelow are for methods to quickly ensure consistent warm-up of trackers. Exemplary embodiments can include performing repeated two-face measurements (i.e., frontsight and backsight measurements) on a single retroreflector target, which might be located either on a tracker (i.e., an on-tracker target, for example, as described in '446) or at an arbitrary point in the volume surrounding the tracker. If the point is located off the tracker, the retroreflector can be placed in a nest, which might be attached, for example, to a floor, instrument stand, or structure. These measurements can be made at regular intervals, which might be closely spaced in time. After each two-face measurement is performed, the two-face error, defined as the difference in distance between the readings of three-dimensional coordinates in the frontsight and backsight modes, is calculated. The two-face readings are used to decide whether the tracker is stable. Ways of doing this are discussed hereinbelow.

In other exemplary embodiment, a second target can be added in a manner that separates translational errors (for example, TX and TY errors) and angular errors (for example, RX and RY errors). There are several ways to separate translational and angular errors in the tracker. The first way is to place two different retroreflector targets at different distances.

Distant targets are more susceptible to the effects of angular errors than are nearby targets, while distant and nearby targets are equally affected by translational errors. Because of this, two-face measurements can be made on two retroreflector targets placed at two different ranges. The readings from these measurements can be used to separate the two types of errors.

A second way of separating translational and angular errors is to select a retroreflector as the first target and a mirror as the second target. The mirror responds most strongly to angular errors in the tracker, while the retroreflector responds to both angular and translational errors. The method for separating translational and angular errors using retroreflector and mirror targets is explained in detail in '446. The criterion for deciding when a tracker is warmed up is based on delta values of two-face measurements for the two different targets. A variety of specific mathematical rules may be used to decide when a tracker has warmed up, as is described below.

In yet another exemplary embodiment, parameters are calculated from the two-face measurements. Some parameters (for example, RX and RY for some types of trackers) may be collected using mirror targets alone. Other types of parameters (for example, TX and TY for some other types of trackers) are collected using two or more retroreflector or mirror targets. The relevant parameters differ according to the specific tracker. For example, parameters are different for a type of tracker that uses a steering mirror to direct the laser beam out of the tracker than for the type of tracker shown in FIG. 1. In general, any parameters for any type of tracker may be used in a mathematical rule that indicates when a tracker is warmed up or stable.

In one or more exemplary embodiments, the tracker 10 can include a user interface that would tell the user the error of the tracker 10 relative to the maximum permissible error (MPE) for that particular target point if the user were to start using the tracker at any particular moment. MPE is a specification that tracker manufacturers publish, which indicate tracker accuracy as a function of range.

Figure 2:
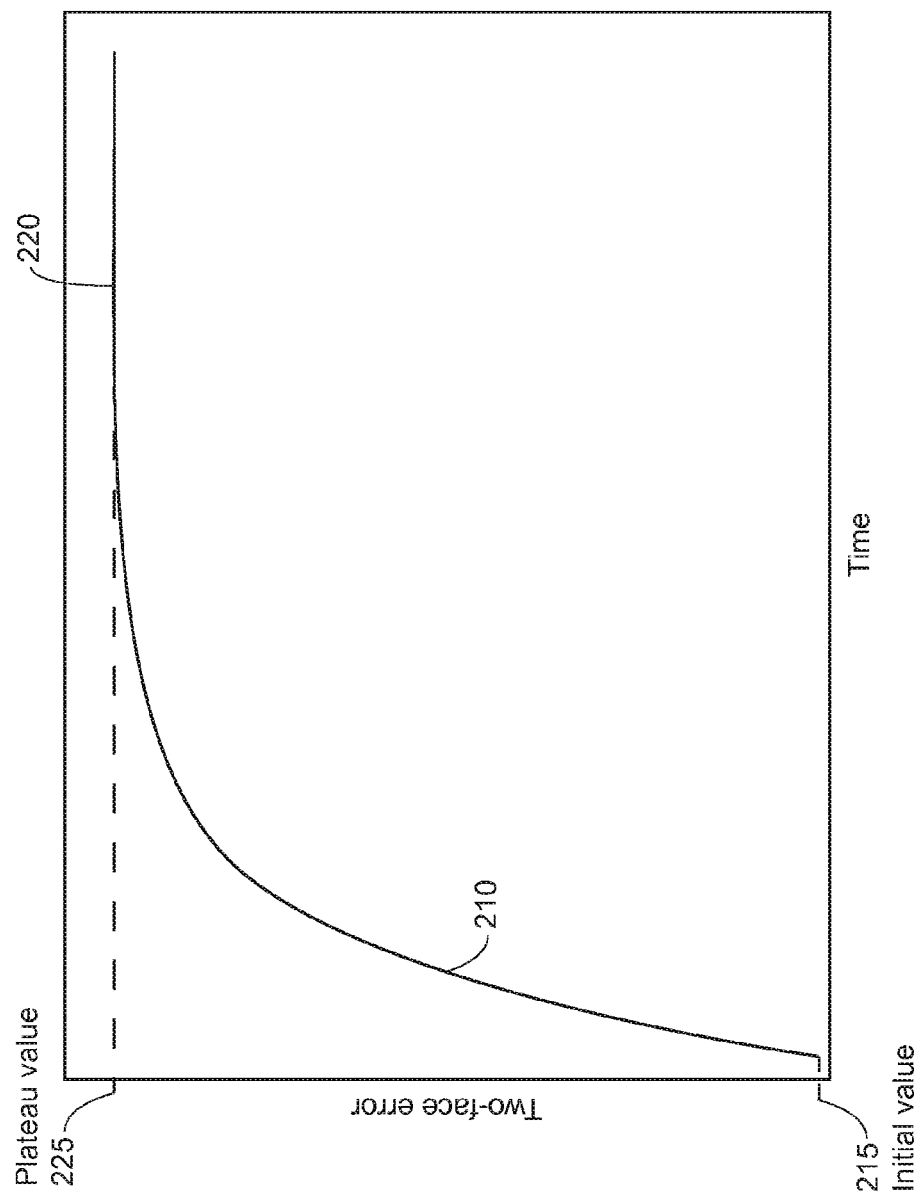
FIG. 2 illustrates a plot of a typical two-face error (in arbitrary units) versus time (in arbitrary units), with noise removed for clarity.

FIG. 2 illustrates a plot of two-face error (in arbitrary units) on the vertical axis versus time (in arbitrary units) on the horizontal axis. The plot illustrates that, as the tracker 10 warms up, it at first has an initial two-face error value 215. As it warms up, the two-face error changes rapidly in a transient phase 210. As time passes, the tracker 10 enters a plateau phase 220 in which the two-face error approaches a plateau value 225, which also might be called a steady-state value. As the tracker 10 nears the plateau value, it is considered stable and ready to be compensated.

Figure 10:
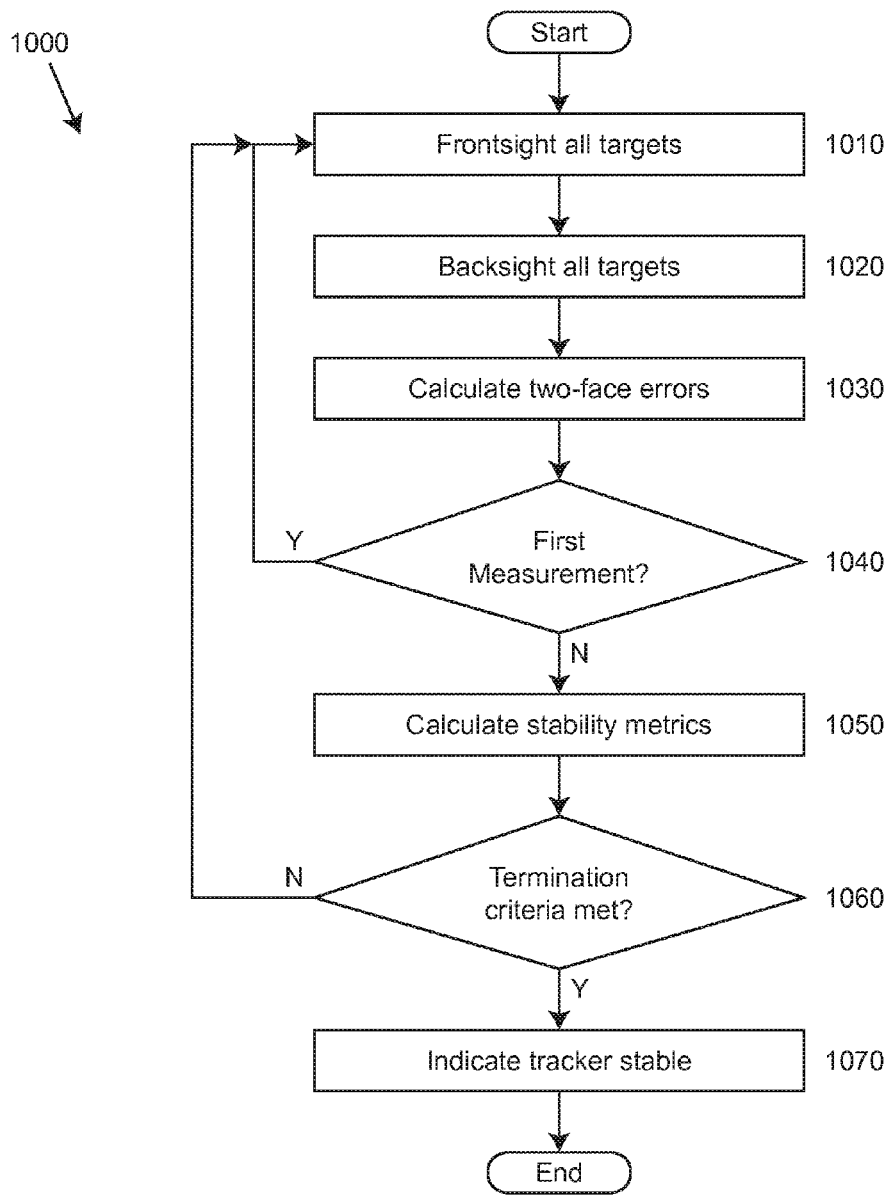
FIG. 10 illustrates a flowchart for a method of checking the stability of a laser tracker.

FIG. 10 shows a flowchart for a first exemplary embodiment for a method 1000 of determining whether an instrument such as a laser tracker is warmed up or stable. At least one target, which may be a retroreflector, a mirror, or a diffusely reflecting object, is needed. Additional targets, which may be any combination of retroreflectors, mirrors, and diffusely reflecting objects, may be used. The procedure includes steps 1010, 1020, 1030, 1040, 1050, 1060 and 1070. Step 1010 is to make a measurement of each target in frontsight mode. Step 1020 is to make a measurement of each target in backsight mode. The order of taking frontsight and backsight measurements is not important. Step 1030 is to calculate the two-face error for each of the targets. The two-face error value is a transverse distance and has units of length. Step 1040 is to decide whether the targets have been measured for the first time. If so, a second set of measurements are made, beginning again with step 1010. If not, the procedure continues to step 1050, where one or more stability metrics are calculated. Before the warm-up test is completed, an indication is given that the tracker may not be stable. For example, an LED may flash to indicate that the tracker may not be stable. As another example, a message such as "Tracker Not Verified Stable" may be given on a computer monitor. After the termination criteria are met in step 1060, an indication is given in step 1070 that the tracker is stable. For example, the indication may be a constantly illuminated LED or a "Tracker Stable" message on a computer monitor.

For the type of laser tracker routinely used with a spherically mounted retroreflector (SMR), the target may be a retroreflector or a mirror. In accordance with the broader definition of laser tracker as described herein, for a laser scanner, the type of target may be a diffusely scattering object. Such an object might be, for example, a large sphere made of diffusely reflecting material. The laser scanner may scan the surface of such a sphere, collecting and analyzing surface points to find the sphere center.

The discussion hereinabove explains that a two-face error is defined as a transverse distance between the three-dimensional coordinates as measured in frontsight and backsight modes. However, another way to establish the stability of a laser tracker is to measure the difference in the angular directions of a laser beam in frontsight mode and backsight mode. The small angular difference in the direction of the laser beam in frontsight and backsight modes is the same as the two-face error except that the angles are not scaled by a distance. For the purposes of establishing the stability of a laser tracker, these two methods are equally good. Therefore, in all of the discussions above, the concept of two-face error can be replaced by the concept of angular difference in frontsight and backsight readings.

A stability metric is any value defined by a rule that decides when the tracker is stable. The stability metric may be a simple number based on a pair of measured two-face errors, or it may be a more complicated value based on several measurements combined according to a mathematical rule. An example of the latter case of a relatively complicated value based on several parameters and on manufacturer's specifications is given hereinbelow with reference to FIG. 4. The stability metric may depend on a series of measured values from the past (for example, a moving average or some other type of filtered value) or simply on the most recently collected measured values. Step 1060 is to decide whether the stability metrics have satisfied the termination criteria. There may be a single termination criterion, or there may be several termination criteria. If there are several termination criteria, then there is a corresponding stability metric for each criterion, although some of the criteria may be obtained without finding two-face errors. For example, one criterion might be that the tracker two-face errors meet manufacturer's MPE specifications. This could be used in conjunction with a second criterion related to the stability of the two-face errors over time. If multiple termination criteria are given, then each of these must be met by the corresponding stability metrics for the tracker to be considered stable. If the stability metrics satisfy the termination criteria, the tracker is considered to be stable or warmed up, and the next step can be carried out. The next step will usually be either to perform a compensation procedure on the tracker or to begin making measurements with the tracker.

Probably the simplest type of stability metric is the absolute value of the delta (difference) in the two preceding two-face errors. The threshold condition in this case can simply be a given numerical value. If the stability metric is less than the threshold value, the tracker is considered to be stable. Otherwise it is not considered to be stable, and two-face measurements are continued. Referring to FIG. 2, we see that initially the two-face errors are changing rapidly, which means that the delta (difference) in the two face values is large. Hence a small delta value is indicative of a stable tracker. One complication is that, in general, the two-face error illustrated in FIG. 2 has some noise in addition to the smooth curve that shows the general trend. In this case, establishing stability based on a single delta value may not provide adequate assurance that the tracker is fully stable.

The steps of method 1000 of FIG. 10 can be conveniently described in words rather than in flowchart format. To calculate the stability metric, at least two two-face errors are needed. Consequently, there are a plurality of backsight measurements, frontsight measurements, and two-face error calculations, and there is at least one stability metric. The frontsight and backsight measurements are alternated. If the termination criteria are not met, any number of repeated two-face measurements may be required before the tracker is regarded as stable.

The discussion above explained that two-face errors are defined as a transverse distance between the coordinates as measured in frontsight and backsight modes. However, another way to establish the stability of a laser tracker is to measure the difference in the angular direction of a laser beam in frontsight mode and backsight mode. The small angular difference in the direction of the laser beam in frontsight and backsight modes is essentially equivalent to the two-face error except that the angles are not scaled by a distance. For the purposes of establishing the stability of a laser tracker, these two methods are equally good. Therefore, in all of the discussions above, the concept of two-face error can be replaced by the concept of angular difference in frontsight and backsight readings.

Figure 11:
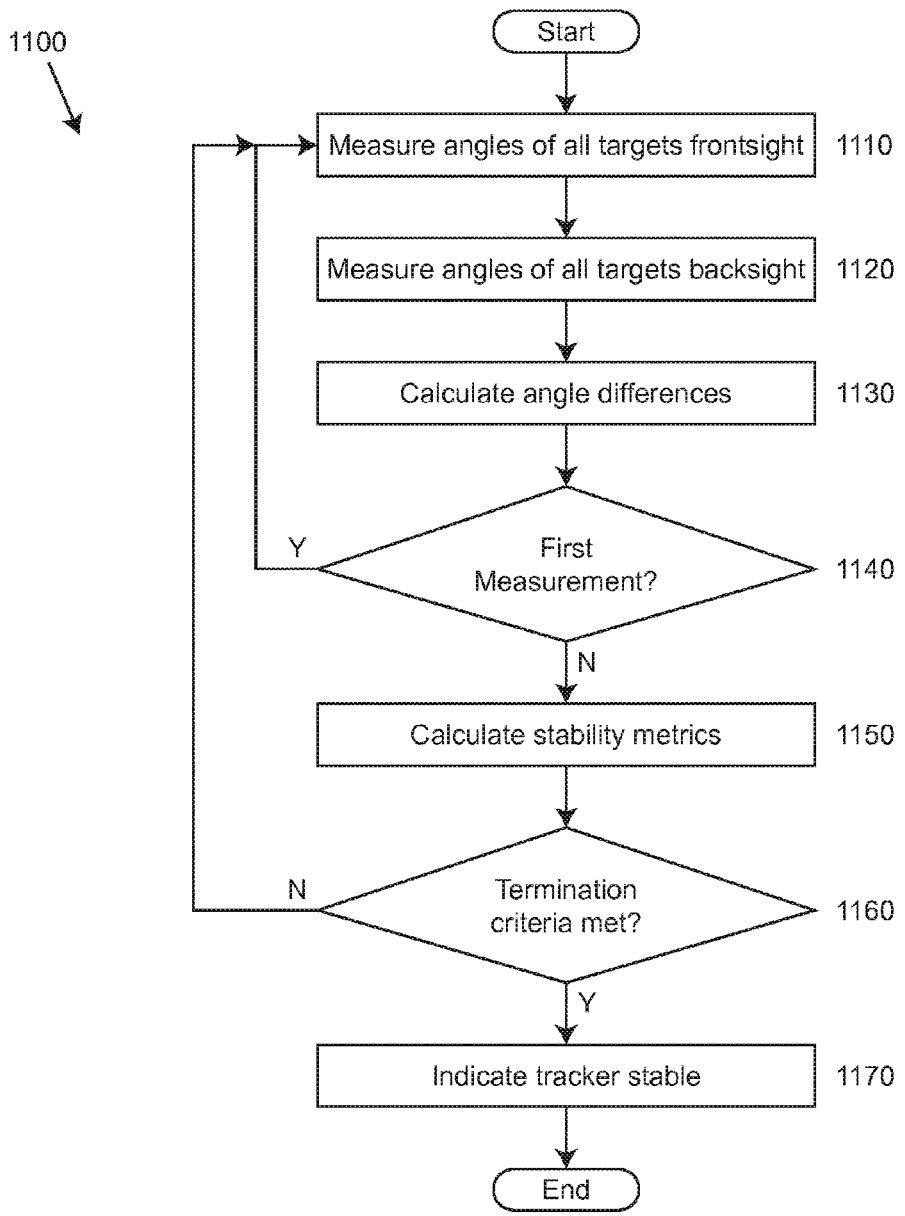
FIG. 11 illustrates a flowchart for a method of checking the stability of a laser tracker.

FIG. 11 shows a flowchart for a first exemplary embodiment for a method 1100 of determining whether an instrument such as a laser tracker is warmed up or stable. At least one target, which may be a retroreflector, a mirror, or a diffusely reflecting object, is needed. Additional targets, which may be any combination of retroreflectors, mirrors, and diffusely reflecting objects, may be used. The procedure includes steps 1110, 1120, 1130, 1140, 1150, 1160, 1170. Step 1110 is to make an angular measurement of each target in frontsight mode. Step 1120 is to make an angular measurement of each target in backsight mode. The order of taking frontsight and backsight measurements is not important. Step 1130 is to calculate the angular difference for each of the targets. Here is it understood that the term angular difference refers to the final pointing directions of the laser beam in the frontsight and backsight modes. So, for example, the azimuth angle is approximately 180 degrees different in frontsight and backsight modes, and the zenith angles also differ in frontsight and backsight modes. However, after the azimuth and zenith rotations have been completed, the laser beams in frontsight and backsight modes point in nearly the same direction. The angular difference between these two directions is therefore a small value. Step 1140 is to decide whether the targets have been measured for the first time. If so, a second set of measurements are made, beginning again with step 1110. If not, the procedure continues to step 1150, where one or more stability metrics are calculated. Before the warm-up test is completed, an indication is given that the tracker may not be stable. For example, an LED may flash to indicate this. As another example, a message such as "Tracker Not Verified Stable" may be given on a computer monitor. After the termination criteria are met in step 1160, an indication is given in step 1170 that the tracker is stable. For example, the indication may be a constantly illuminated LED or a "Tracker Stable" message on a computer monitor.

Figure 3:
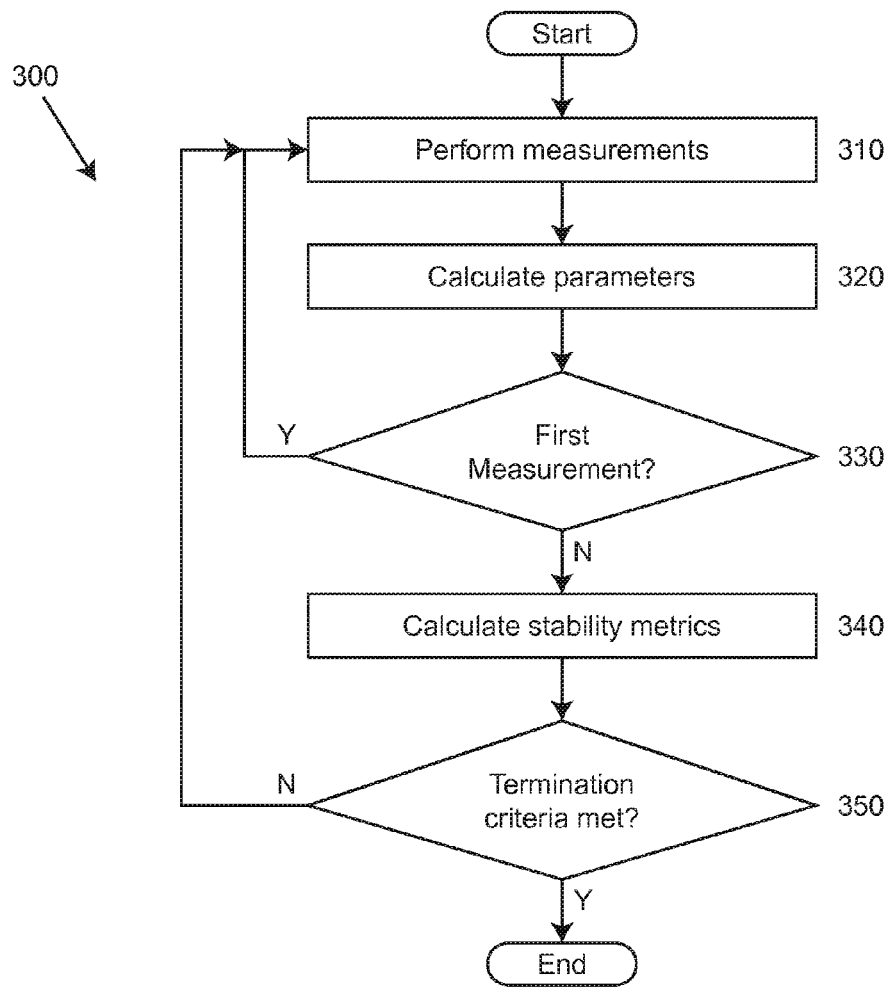
FIG. 3 illustrates a flowchart for a stability method in accordance with exemplary embodiments.

FIG. 3 illustrates a flowchart for a second exemplary embodiment for a method 300 of determining whether an instrument such as a laser tracker is warmed up or stable. The method 300 includes steps 310, 320, 330, 340, and 350. Step 310 is to make two-face measurements on at least two targets, which may be retroreflector or mirror targets. Step 310 may also optionally include measurements in addition to two-face measurements. Step 320 is to calculate instrument compensation parameters, generally a subset of parameters rather than a complete set of instrument parameters. The measurements performed in step 310 provide sufficient information to calculate at least some parameters of the instrument. Step 330 is to check whether the measurements of step 310 were performed for the first time. If so, they are performed again, starting with step 310. If not, step 340 is carried out to calculate a stability metric. Step 350 is to check whether the stability metric is less than the threshold value. If so, the instrument is considered to be stable or warmed up. Otherwise, additional measurements and calculations, beginning with step 310, are repeated iteratively.

The method 300 as described with respect to FIG. 3 is an overall method for which further exemplary embodiments are now described.

Figure 4:
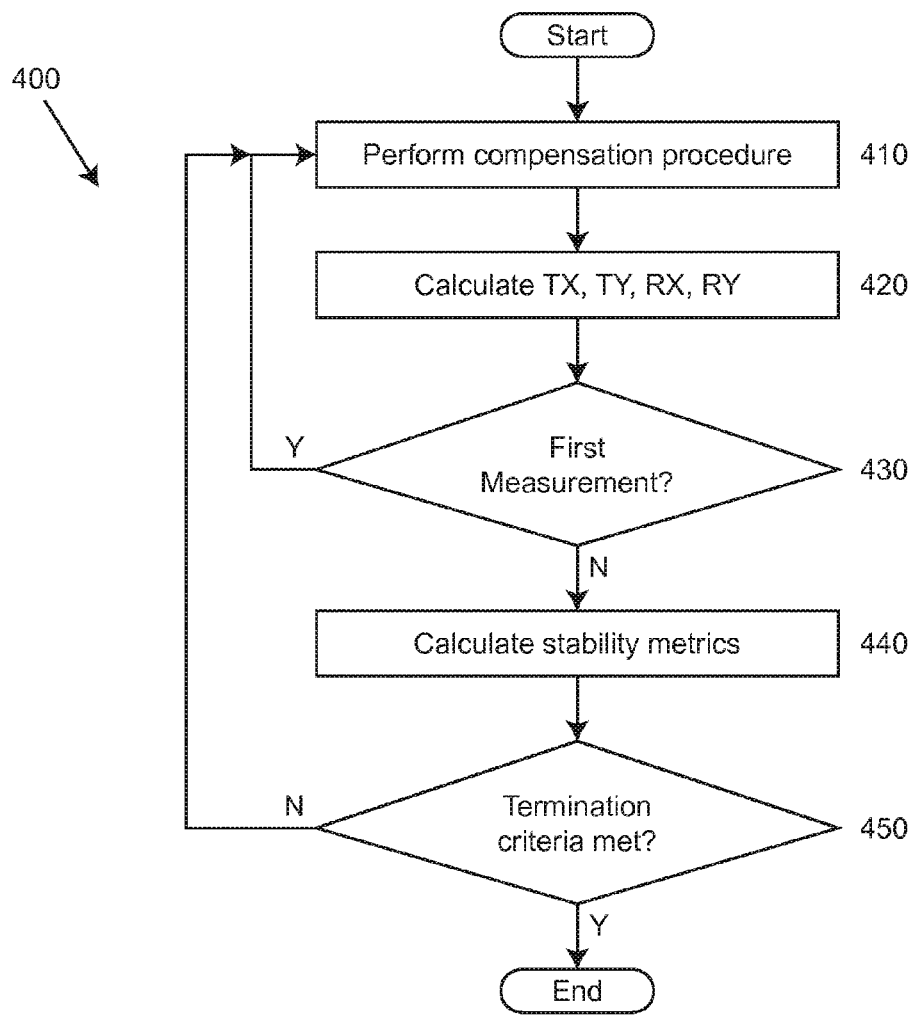
FIG. 4 illustrates a stability method involving the calculation of parameters in accordance with exemplary embodiments.

FIG. 4 illustrates a method 400 in accordance with exemplary embodiments. The method 400 includes steps 410, 420, 430, 440, and 450. Step 410 is to perform a compensation procedure. For the exemplary laser tracker shown in FIG. 1 and described more fully in '446, a convenient compensation procedure is a self-compensation procedure in which two on-tracker targets, an on-tracker retroreflector and an on-tracker mirror, are used in a fully automated tracker procedure to find tracker parameters. This procedure takes about 4 to 5 minutes to carry out. Other compensation procedures can equally well be used. Step 420 is to calculate tracker parameters TX, TY, RX, and RY. The self-compensation procedure obtains these tracker parameters, among others. Step 430 is to check whether the compensation procedure was performed for the first time. If so, the compensation procedure is performed a second time, and the parameter values are again calculated. If not, step 440 is carried out to find a stability metric S. More details on the method for calculating the stability metric S are given hereinbelow. Step 450 is to check whether the termination criterion has been met by the stability metric. If so, the tracker would be considered stable and the method 400 ends. Following this, either tracker compensation or commencement of measurements by the tracker begins. For the particular exemplary embodiment discussed below, the stability metric can vary from 0 to 1 (or 0 to 100%), with 0 indicating the least stable tracker and 1 indicating the most stable tracker. As an example, a termination criterion of 0.9 (or 90%) might be selected. The tracker would then be considered stable if the stability metric were greater than or equal to 0.9.

In an embodiment, the stability metric S is calculated by performing the following steps. The changes in the kinematic model parameters RX, RY, TX, TY are calculated:

$$\Delta RX = RX_{new} - RX_{old}, \Delta RY = RY_{new} - RY_{old}, \Delta TX = TX_{new} - TX_{old}, \Delta TY = TY_{new} - TY_{old}. \quad (1)$$

Here the subscripts "new" refers to the parameters calculated in the most recent measurement and the subscript "old" refers to the parameters calculated in the measurement just before the most recent measurement.

Root-sum-squared (rss) values, $\Delta R$, $\Delta T$, are calculated for the x and y components of the changes in the kinematic model parameters:

$$\Delta R = \sqrt{\Delta RX^2 + \Delta RY^2}, \Delta T = \sqrt{\Delta TX^2 + \Delta TY^2}. \quad (2)$$

The standard transverse uncertainty $U_{std}$ of the instrument as a function of range d is found based on the manufacturer's published specification values A and B:

$$U_{std}(d)=A+B \cdot d. \quad (3)$$

The transverse uncertainty $U_{prm}$ associated with stability of the parameters is found based on the calculated values $\Delta T$ and $\Delta R$ obtained from Equation (2):

$$U_{prm}(d)=\Delta T+\Delta R \cdot d. \quad (4)$$

The uncertainty values $U_{std}$ and $U_{prm}$ from Equations (3) and (4) are combined to obtain a root-sum-squared (rss) value $U_{adj}$:

$$U_{adj}(d)=\sqrt{U_{std}^2(d)+U_{prm}^2(d)}. \quad (5)$$

The range dependent stability ratio s=s(d) is defined as $$s(d) = \frac{U_{std}(d)}{U_{adj}(d)}. \quad (6)$$

The stability metric S is defined as the minimum value of the stability ratio over the possible ranges of the tracker, which extend from $d_{min}$ to $d_{max}$:

$$S=\text{Min}(s(d)). \quad (7)$$

As defined in equation (7), S is a dimensionless number that lies on an interval [0, 1]. Immediately after the tracker 10 is powered on, the temperature and the kinematic model parameters may change rapidly, resulting in a relatively low value for S. Later, as the temperature nears equilibrium and the model parameters change more slowly, S approaches 1. The self-compensation cycle terminates when S exceeds the specified tolerance. A typical tolerance would be 0.9. The method described above need not be a linear function of A and B as given in Equation (3) but could easily be generalized in other exemplary embodiments. For example, if the manufacturer's performance specification is a nonlinear function of range, one merely changes the formula equation (3) above. An advantage of the embodiments of FIGS. 3 and 4 is that when the automated warm-up has completed, the tracker 10 is not only warmed up but also compensated. This method is particularly convenient if the self-compensation method described hereinabove is used, since this requires a minimum of user attention. The user need only run a quick test to verify the accuracy of the instrument before taking measurements.

Figure 5:
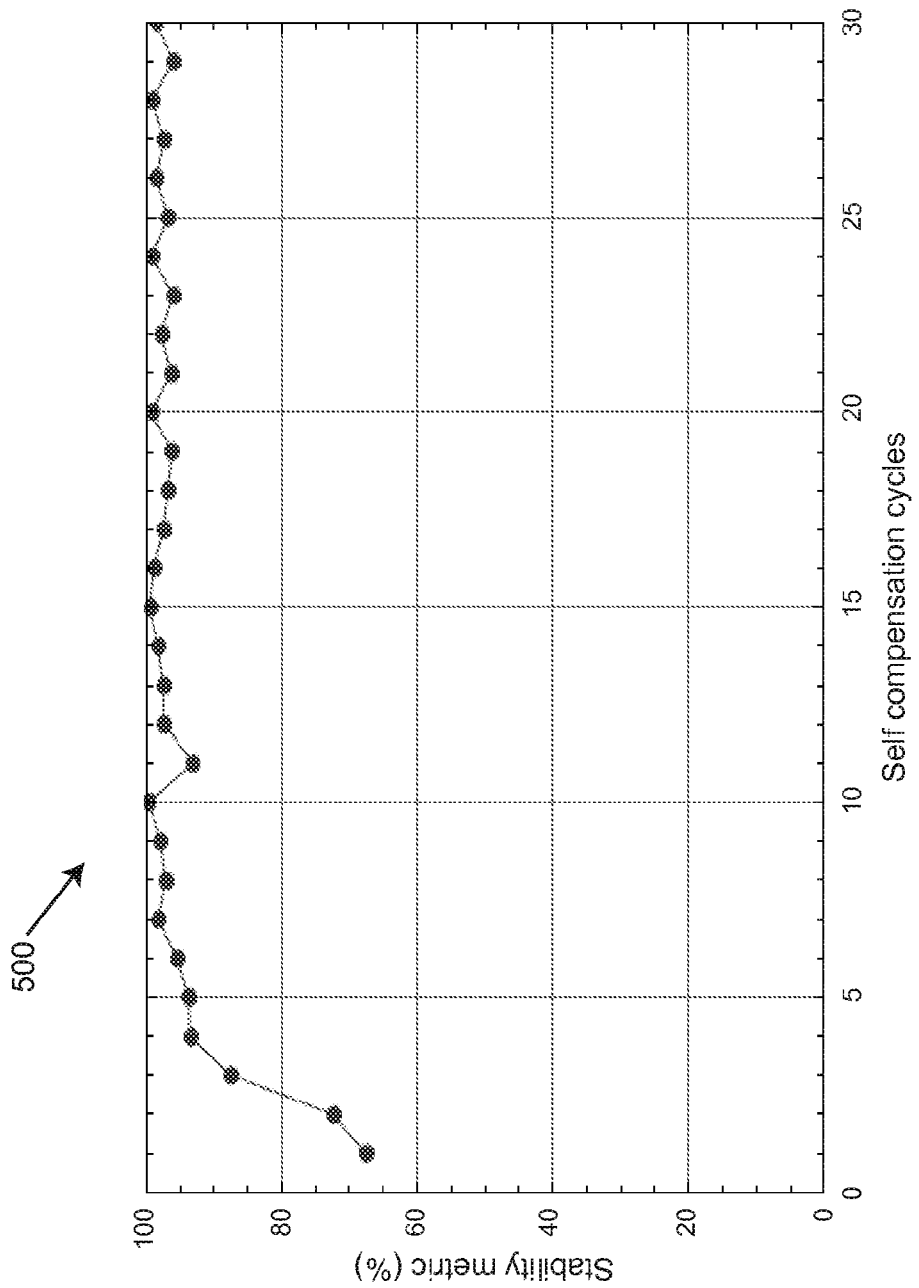
FIGS. 5-8 illustrate plots of the stability metric in percent versus number of self-compensation cycles to demonstrate the method of FIG. 4.
Figure 6:
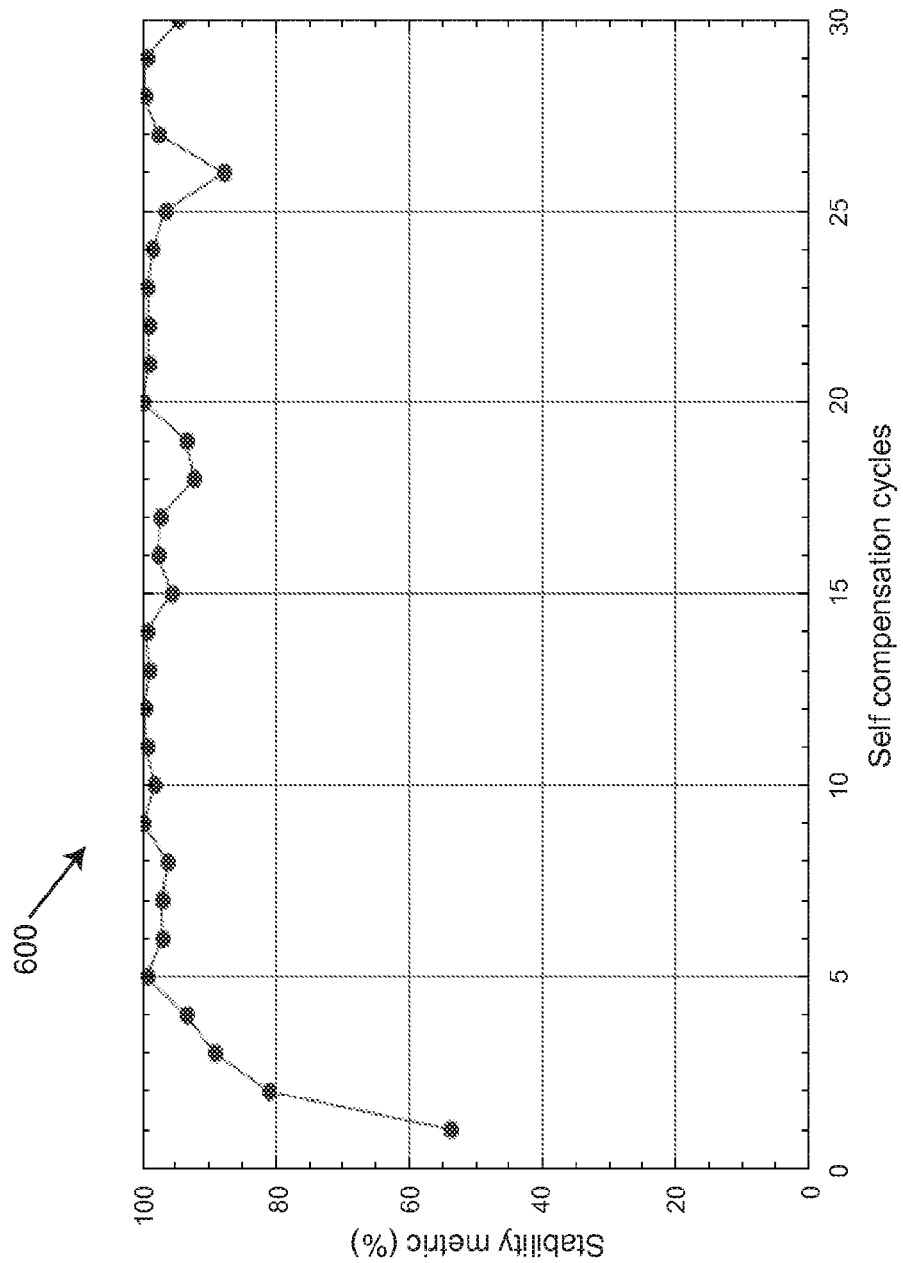
Figure 7:
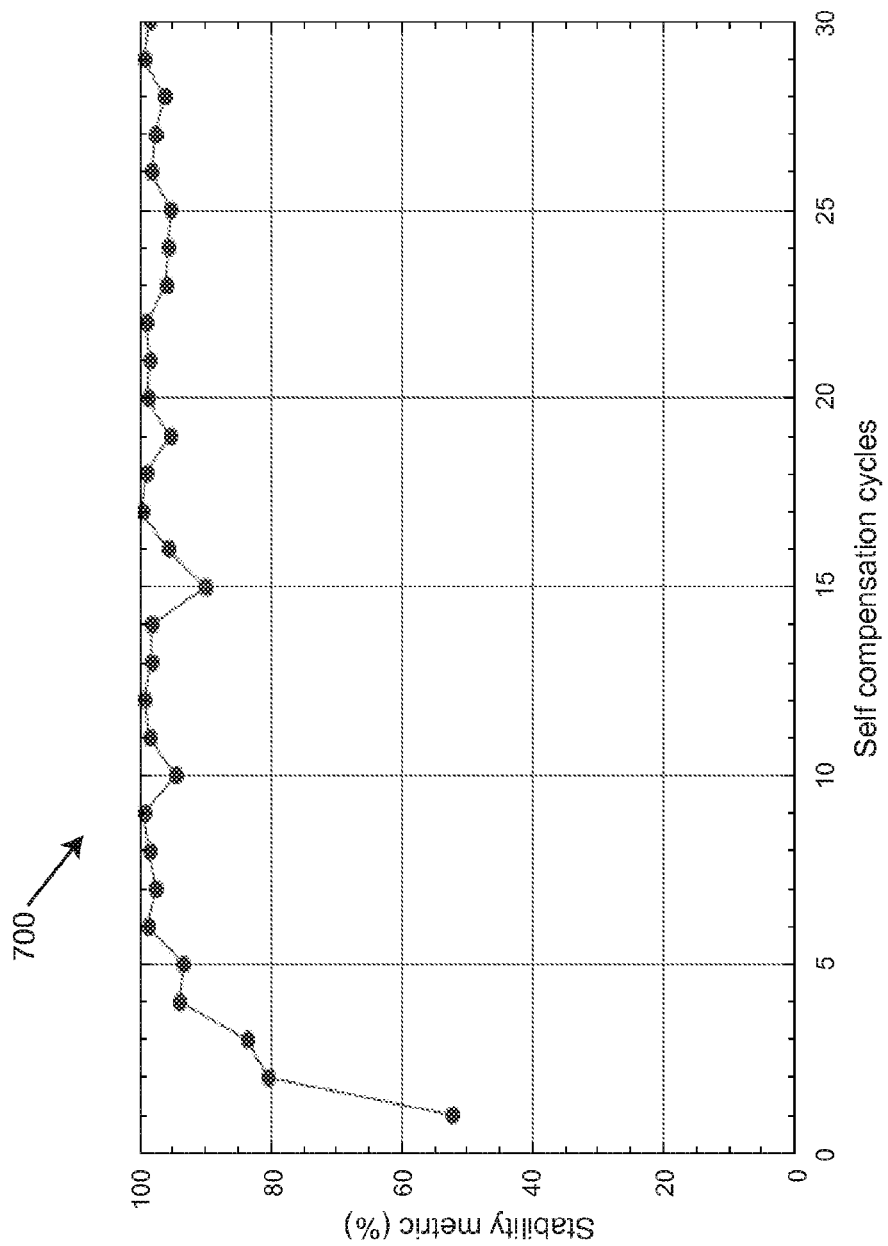
Figure 8:
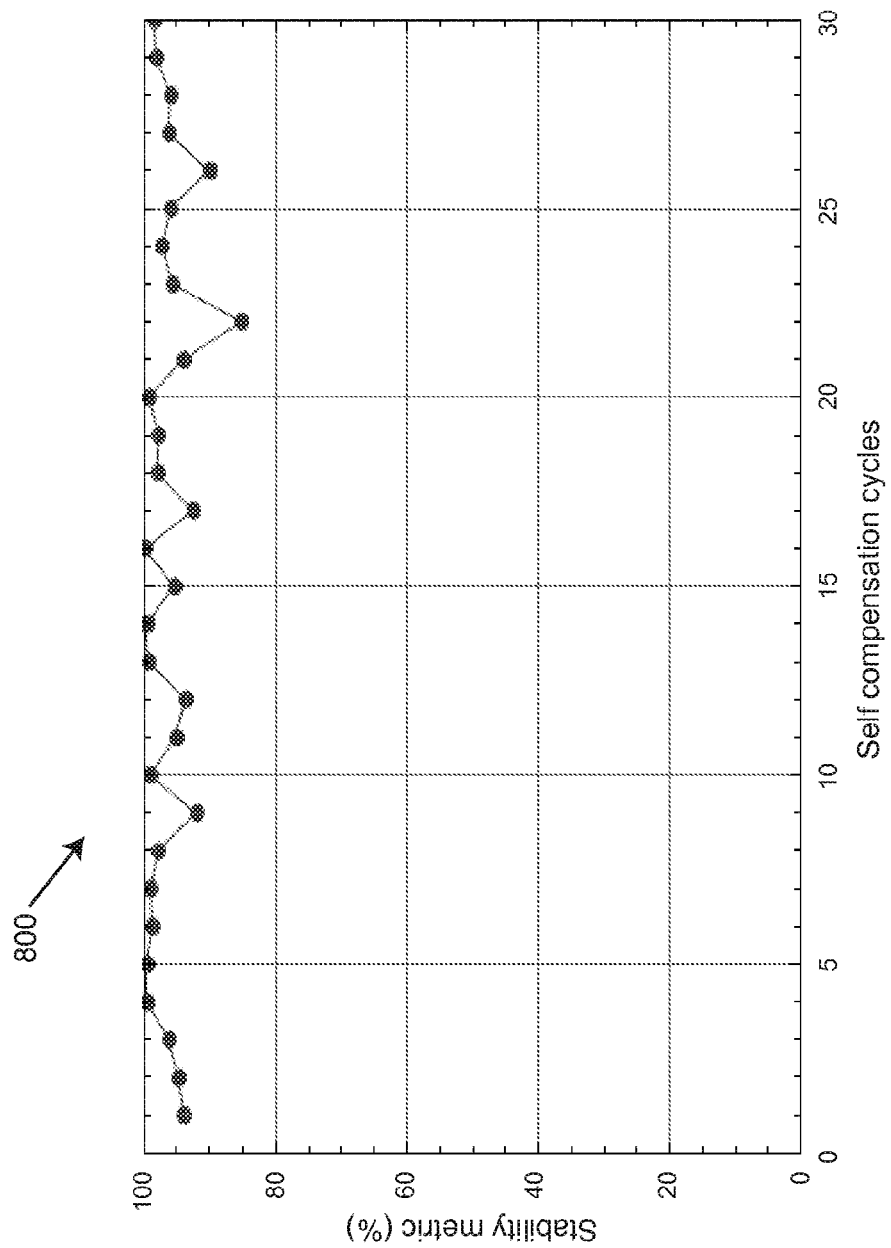

FIGS. 5-8 illustrate plots 500, 600, 700, 800 of the stability metric versus number of self-compensation cycles to demonstrate the method 400. FIGS. 5-7 illustrate trackers that were started from a cold condition and FIG. 8 illustrates a tracker that was already thermally equilibrated. FIGS. 5-8 illustrate that the warm-up time occurs over approximately five compensation cycles (i.e., about 25 minutes). It is appreciated that FIGS. 5-8 illustrate only examples and are illustrative of the method 400. In other exemplary embodiments, other numbers of compensation cycles are possible. FIGS. 5-8 therefore illustrate that as thermal equilibrium approaches, the plots 500, 600, 700, 800 demonstrate the plateau behavior as supported by the method 400.

In another exemplary embodiment, a self-test compensation method performs the automated measurement and computes the parameters. The targets are used for these measurements include a tracker mounted retroreflector and a tracker mounted mirror. The algorithm evaluates the termination criterion is called the sign change algorithm (SC). In SC, when the parameter in question has stabilized, random oscillations in its value start to become important relative to any systematic behavior due to warm-up, which tends to be monotonic in nature. SC computes the delta in each parameter from cycle to the next. Each time the delta changes sign, a counter for the associate parameter is incremented. The loop is terminated when each parameter has undergone N sign changes, where N is a previously specified integer greater equal to 1. N may be specified either by the user or by the tracker manufacturer. The termination criterion is effectively loosened or tightened by decreasing or increasing N, respectively. An advantage of the SC embodiment is that when the automated startup has completed, the tracker is not only warmed up but also compensated, since it is based on the self-compensation method.

The methods described above may be implemented manually or with the aid of a computing system located either internal to the tracker or in an external computer system attached to the tracker. Methods based on the use of a computing system, either internal or external to the tracker, are advantageous because they save operator time.

Figure 9:
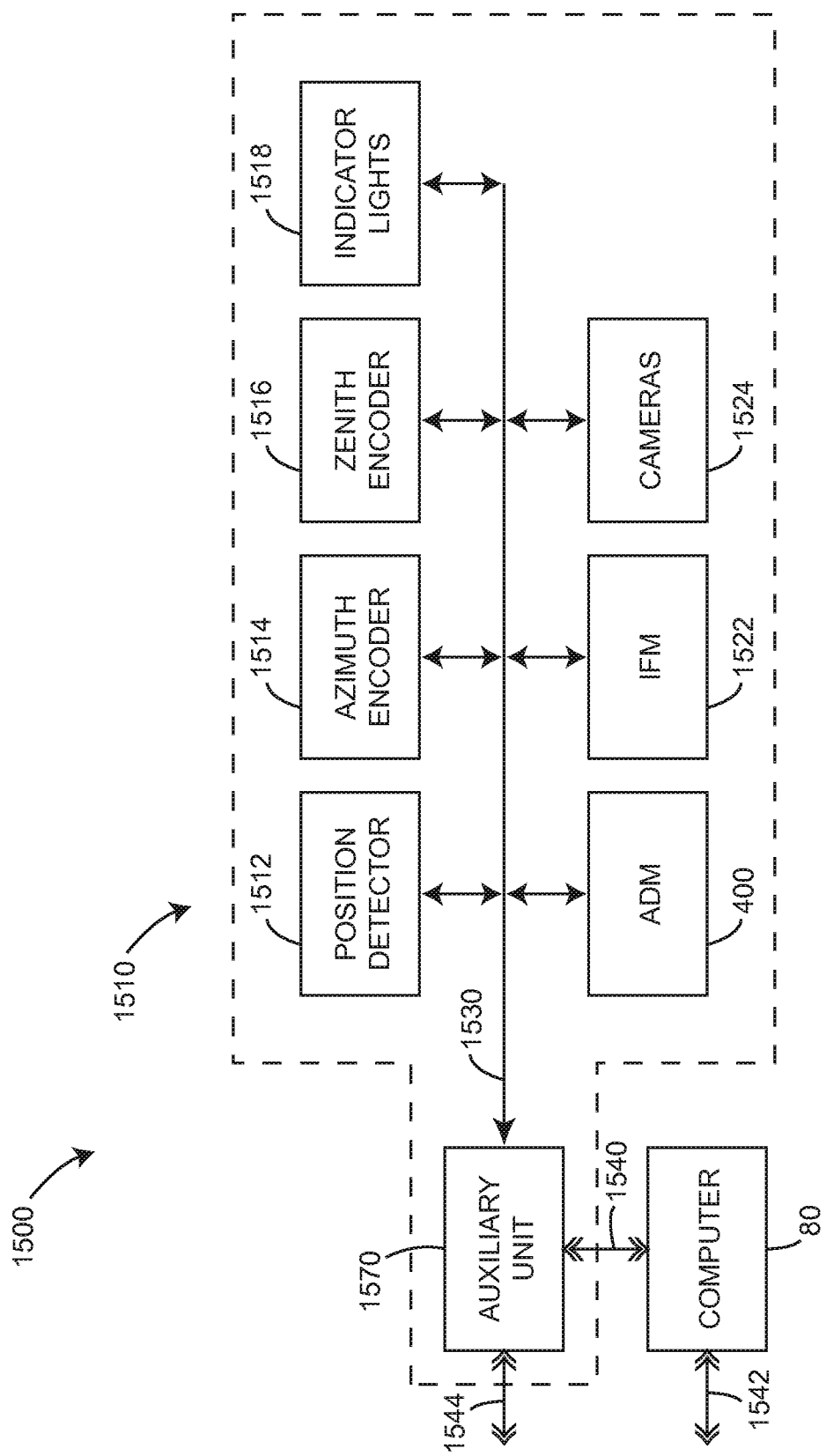
FIG. 9 illustrates an exemplary computing system for a laser tracker.

An exemplary computing system (processing system) 1500 is shown in FIG. 9. Processing system 1500 comprises tracker processing unit 1510 and optionally computer 80. Processing unit 1510 includes at least one processor, which may be a microprocessor, digital signal processor (DSP), field programmable gate array (FPGA), or similar device. Processing capability is provided to process information and issue commands to internal tracker processors. Such processors may include position detector processor 1512, azimuth encoder processor 1514, zenith encoder processor 1516, indicator lights processor 1518, absolute distance meter (ADM) processor 400, interferometer (IFM) processor 1522, and camera processor 1524. Auxiliary unit processor 1570 optionally provides timing and microprocessor support for other processors within tracker processor unit 1510. Preferably, auxiliary unit processor 1570 communicates with other processors by means of device bus 1530, which may transfer information throughout the tracker by means of data packets, as is well known in the art. Computing capability may be distributed throughout tracker processing unit 1510, with DSPs and FPGAs performing intermediate calculations on data collected by tracker sensors. The results of these intermediate calculations are returned to auxiliary unit processor 1570. Auxiliary unit 1570 may be attached to the main body of laser tracker 10 through a long cable, or it may be pulled within the main body of the laser tracker so that the tracker attaches directly (and optionally) to computer 80. Auxiliary unit 1570 may be connected to computer 80 by connection 1540, which is preferably an Ethernet cable or wireless connection. Auxiliary unit 1570 and computer 80 may be connected to the network through connections 1542, 1544, which may be Ethernet cables or wireless connections. Stability computations as described in the exemplary embodiments herein may use processors (microprocessors, DSPs, or FPGAs) from within processing unit 1500 or by optional computer 80.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the automated warm-up methods are implemented in hardware, the automated warm-up methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), FPGAs, DSPs, etc.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for determining when a laser tracker is warmed up enough to be considered stable, the method comprising:
    obtaining a plurality of first two-face errors sequentially in time, each one of the plurality of the first two-face errors obtained, under control of a processor, by pointing a beam of light from the tracker to a first target, measuring the first target in a frontsight mode of the tracker to obtain a first frontsight reading, pointing the beam of light from the tracker to the first target in a backsight mode of the tracker to obtain a first backsight reading, determining the first two-face error by calculating a transverse distance between the first frontsight reading and the first backsight reading;

determining, by the processor, a first stability metric based at least in part on the plurality of first two-face errors, the first stability metric being a measure of the extent to which thermal equilibrium is approached by the tracker; and;

generating an indication whether the laser tracker is stable or not stable.

2. The method of claim 1 further comprising:

obtaining a plurality of second two-face errors sequentially in time, each one of the plurality of the second two-face errors obtained, under control of a processor, by pointing the beam of light from the tracker to a second target, measuring the second target in a frontsight mode of the tracker to obtain a second frontsight reading, pointing the beam of light from the tracker to the second target in a backsight mode of the tracker to obtain a second backsight reading, determining the second two-face error by calculating a transverse distance between the second frontsight reading and the second backsight reading;

determining, by the processor, a second stability metric based at least in part on the plurality of second two-face errors, the second stability metric being a measure of the extent to which thermal equilibrium is approached by the tracker; and in the step of generating an indication whether the laser tracker is stable or not stable, basing the generating at least in part on the second stability metric.

3. The method of claim 1, further comprising selecting the first target to be a retroreflector.

4. The method of claim 1, further comprising selecting the first target to be a mirror.

5. The method of claim 1, further comprising mounting the first target on the laser tracker.

6. The method of claim 1, further including calculating a plurality of compensation parameters based at least in part on the plurality of first two-face errors, wherein the first stability metric is further based at least in part on the plurality of compensation parameters.

7. The method of claim 2, further comprising selecting the first target to be a retroreflector and the second target to be a mirror.

8. The method of claim 2, further comprising selecting the first target to be a retroreflector and the second target to be a retroreflector.

9. The method of claim 2, further comprising calculating, by the processor, a plurality of compensation parameters based at least in part on the plurality of second two-face errors, wherein the second stability metric is based at least in part on the plurality of compensation parameters.

10. The method of claim 2, further comprising mounting the first target and the second target on the laser tracker.

11. The method of claim 1, wherein the step of generating an indication is based at least in part on a manufacturer's specification for the laser tracker.

12. The method of claim 1 wherein determining the first stability metric depends on a series of values measured by the laser tracker.

13. The method of claim 1 wherein the step of determining the first stability metric is based at least in part on an absolute value of a difference in two preceding first two-face errors.

14. The method of claim 1 wherein each of the plurality of first frontsight readings are based on a cloud of points collected by the laser tracker and each of the plurality of first backsight readings are based on the cloud of points collected by the laser tracker.

15. A method for determining when a laser tracker is warmed up enough to be considered stable, the method comprising:

obtaining by a processor, a plurality of first angular differences sequentially in time, each one of the plurality of first angular differences obtained, under control of a processor, by pointing a beam of light from the tracker to a first target, measuring a first angle to the first target in a frontsight mode of the tracker, pointing the beam of light from the tracker to the first target in a backsight mode of the tracker, measuring a second angle to the first target in a backsight mode of the tracker, determining a first angle error based at least in part on the first angle and the second angle;

determining, by the processor, a first stability metric based at least in part on the plurality of first angle errors, the first stability metric being a measure of the extent to which thermal equilibrium is approached by the tracker; and generating an indication whether the laser tracker is stable or not stable.

16. The method of claim 15 further comprising:

obtaining a plurality of second angular differences sequentially in time, each one of the plurality of second angular differences obtained, under control of a processor, by pointing a beam of light from the tracker to a second target, measuring a third angle to the second target in a frontsight mode of the tracker, pointing the beam of light from the tracker to the second target in a backsight mode of the tracker, measuring a fourth angle to the second target in a backsight mode of the tracker, determining a second angle error based at least in part on the third angle and the fourth angle;

determining, by the processor, a second stability metric based at least in part on the plurality of second angle errors, the second stability metric being a measure of the extent to which thermal equilibrium is approached by the tracker; and in the step of generating an indication whether the laser tracker is stable or not stable, basing the generating at least in part on the second stability metric.

17. The method of claim 15 wherein each of the plurality of first angle measurements based on a cloud of points collected by the laser tracker and each of the plurality of second angle measurements is based on a cloud of points collected by the laser tracker.

* * * * *